United States Patent
McCann et al.

(10) Patent No.: US 7,376,840 B2
(45) Date of Patent: May 20, 2008

(54) STREAMLINED SERVICE SUBSCRIPTION IN DISTRIBUTED ARCHITECTURES

(75) Inventors: Peter James McCann, Naperville, IL (US); Kumar Venkata Vemuri, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 954 days.

(21) Appl. No.: 10/260,843

(22) Filed: Sep. 30, 2002

(65) Prior Publication Data

US 2004/0064707 A1 Apr. 1, 2004

(51) Int. Cl.
*H04K 1/00* (2006.01)
(52) U.S. Cl. ..................................... 713/185
(58) Field of Classification Search ............. 713/185
See application file for complete search history.

(56) References Cited

U.S. PATENT DOCUMENTS

| | | | | |
|---|---|---|---|---|
| 6,256,664 | B1* | 7/2001 | Donoho et al. | 709/204 |
| 6,463,534 | B1* | 10/2002 | Geiger et al. | 713/168 |
| 6,948,070 | B1* | 9/2005 | Ginter et al. | 713/193 |
| 2002/0002468 | A1* | 1/2002 | Spagna et al. | 705/1 |
| 2002/0010679 | A1* | 1/2002 | Felsher | 705/51 |
| 2003/0093694 | A1* | 5/2003 | Medvinsky et al. | 713/201 |
| 2003/0149880 | A1* | 8/2003 | Shamsaasef et al. | 713/182 |
| 2003/0163684 | A1* | 8/2003 | Fransdonk | 713/153 |

OTHER PUBLICATIONS

Microsoft dictionary, p. 470, third edition, microsoft press.*

* cited by examiner

*Primary Examiner*—Kambiz Zand
*Assistant Examiner*—Aubrey H Wyszynski

(57) ABSTRACT

Cryptography is used to generate a token that both authorizes request processing and establishes constraints on that authorization. A mobile communications device user or client subscribes to an information service of a content provider. A description of the subscribed service is generated. The client applies a digital signature to the description and optionally encrypts the signed description. A token is generated based on the signed description. The content provider presents the token to the request processing entity of a mobile service provider in order to establish trust between the content provider and the request processing entity. The request processing entity decrypts the token and verifies the signature of the client. The request of the content provider is validated through a comparison of the request with the constraints indicated in the decrypted token. Valid requests are processed. For example, a request for location information about the client is fulfilled in order for the content provider to push a local weather report to the mobile device of the client.

31 Claims, 3 Drawing Sheets

STREAMLINED SERVICE SUBSCRIPTION IN DISTRIBUTED ARCHITECTURES

FIELD OF THE INVENTION

The invention is related to the art of information services. More particularly, the invention is related to the art of providing and delivering information services in distributed architectures, wherein, for example, subscription fulfillment services are provided by one entity and service requests are processed by another entity. The invention is described in reference to location-based services, where users can subscribe to a service to receive location-sensitive content delivered to a mobile device. However, those of ordinary skill in the art will understand that the invention can be used in a vast array of other applications. For example, the invention can be applied wherever a first entity must request a good or service from a second entity on behalf of a client, in order to deliver another good or service to the client, and where the second entity must have assurance that honoring the request of the first entity is authorized.

BACKGROUND OF THE INVENTION

Users can subscribe to a service to receive location-sensitive content delivered to a mobile device, such as a mobile telephone or personal digital assistant. For example, based on such a subscription, every day, within a subscription period, whenever certain pre-defined conditions are satisfied, information is transmitted or pushed to the device of the user. For instance, a user or client might subscribe to a service (either via a mobile device, such as a mobile phone or electronic organizer, or from a computer), by visiting a web page of a content provider. The web page enables the user to subscribe to weather forecasts, for example, every day at 8 a.m. The content provider locates the client every morning at 8 a.m. and pushes location-specific content (e.g., a weather forecast at his current location) to his mobile device. Even if the user travels, the user gets weather forecasts for the current location of the user every morning.

For services such as the above to work, two levels of subscription are required, especially if the content provider and a mobile communications link provider (or service request processor) are different business entities. For example, consider the situation where a server that is external to a mobile communications provider (say a server that belongs to weather.com) is the one serving weather content. The client or user registers for the service with the external third party content provider for the location-specific information. Currently, the client would also have to register with the mobile phone service provider so that the mobile phone service provider is aware that the weather application from the third party (weather.com) is authorized to access the client's location information, for example, every day at 8 a.m. Only after both these registrations have been processed, can the daily service be successfully provided.

This scenario does not work with a single subscription. For example, if the client were to register only with the third part content provider, the mobile phone service provider has no easy means of authorizing the content provider. The mobile phone service cannot easily determine that the client did indeed request the subscription and wants the content provider to be provided the client's location information. This is important, for otherwise, a devious content provider might register a hundred end users as clients, and then subsequently sell their location information to unscrupulous third parties.

If, on the other hand, the client registered the subscription only with the mobile phone service provider, unless that subscription percolated down into the appropriate content provider server, the content provider would not commence serving the client. Such a percolation is only practical where the mobile phone service provider has knowledge of, and perhaps a prior business relationship with, the content provider. Therefore, in this case, the customer has lesser control on which content provider to pick to service a given content request. For example, if two content providers, such as, for example, weather.com and cnn.com/weather provide similar forecast pushing services, the mobile phone service provider might favor one over the other (say the first over the second). However, given the nature of the service the client is subscribing to, the client might actually prefer the latter, since the latter offers the client features that are of greater interest to him.

Having to manually provision for a service with two different service providers can be frustrating to clients. Therefore, there is a desire for a simple, efficient and scalable mechanism to transparently handle a two-step subscription process. Preferably, with such a mechanism, the content provider server and the communications service provider Request Processing Entity (RPE) mutually authenticate before an authorization step is performed. For example, the authenticated identity of the remote party or client is used in the authorization step to ensure that the remote party or client is indeed who they say they are. The RPE may be, for example an MPC (Mobile Positioning Center) in North American markets, or a GMLC (Gateway Mobile Location Center) for EMEA (Europe, Middle East, Asia).

SUMMARY OF THE INVENTION

A method of providing a service in a distributed architecture environment, where the environment includes a client, a first entity providing a first good and/or service to the client and a second entity providing a second good and/or service to the client, wherein the first entity must request an aspect of the second good or service from the second entity in order to deliver the first good or service to the client, and wherein the second entity must have assurance that honoring the request of the first entity is authorized, has been developed. The method includes the client ordering a first good or service from the first entity, generating a description of the aspect of the second good or service, an authorizing entity signing the description and optionally encrypting the signed description. Generating a token from the signed description or encrypted signed description. The first entity including the token with the request made of the second entity, the second entity decrypting the token if it was encrypted, the second entity verifying the signature of the client, the second entity honoring the request, and the first entity delivering the first good or service to the client based on the honored request.

For example, one embodiment is a method of providing a service in a distributed architecture environment, the environment including a client, a content provider and a request processing entity. The method includes the client making a subscription request of the content provider, the content provider generating a subscription description, the client adding a digital signature to the subscription description, optionally encrypting the signed subscription description, thereby generating a token, including the token in a request made of the request processing entity if it was encrypted, the request processing entity decrypting the token, the request processing entity verifying the digital signature of the client, the request processing entity processing the request, and the content provider providing the service to the client based on results of the processed request.

For instance, the subscription description indicates that a local weather report is to be sent to a mobile device of the client once a day. An aspect of the service provided by the request processing entity is a mobile device locating service. The subscription description indicates that the request processing entity is to provide the content provider information related to the location of the mobile device once a day.

BRIEF DESCRIPTION OF THE DRAWINGS

The invention may take form in various components and arrangements of components, and in various procedures and arrangements of procedures. The drawings are not to scale and are only for purposes of illustrating a preferred embodiment and are not to be construed as limiting the invention.

DETAILED DESCRIPTION OF THE INVENTION

Cryptographic operations such as public key infrastructure (PKI) related techniques are gaining wider acceptance, and some public key techniques (such as, for example, Rivest, Shamir, Adelmen (RSA)) are in the public domain. These and related technologies can be used to provide a user or client with a one stop shopping subscription provisioning experience, thereby simplifying or streamlining the subscription registration process.

Figure 1:
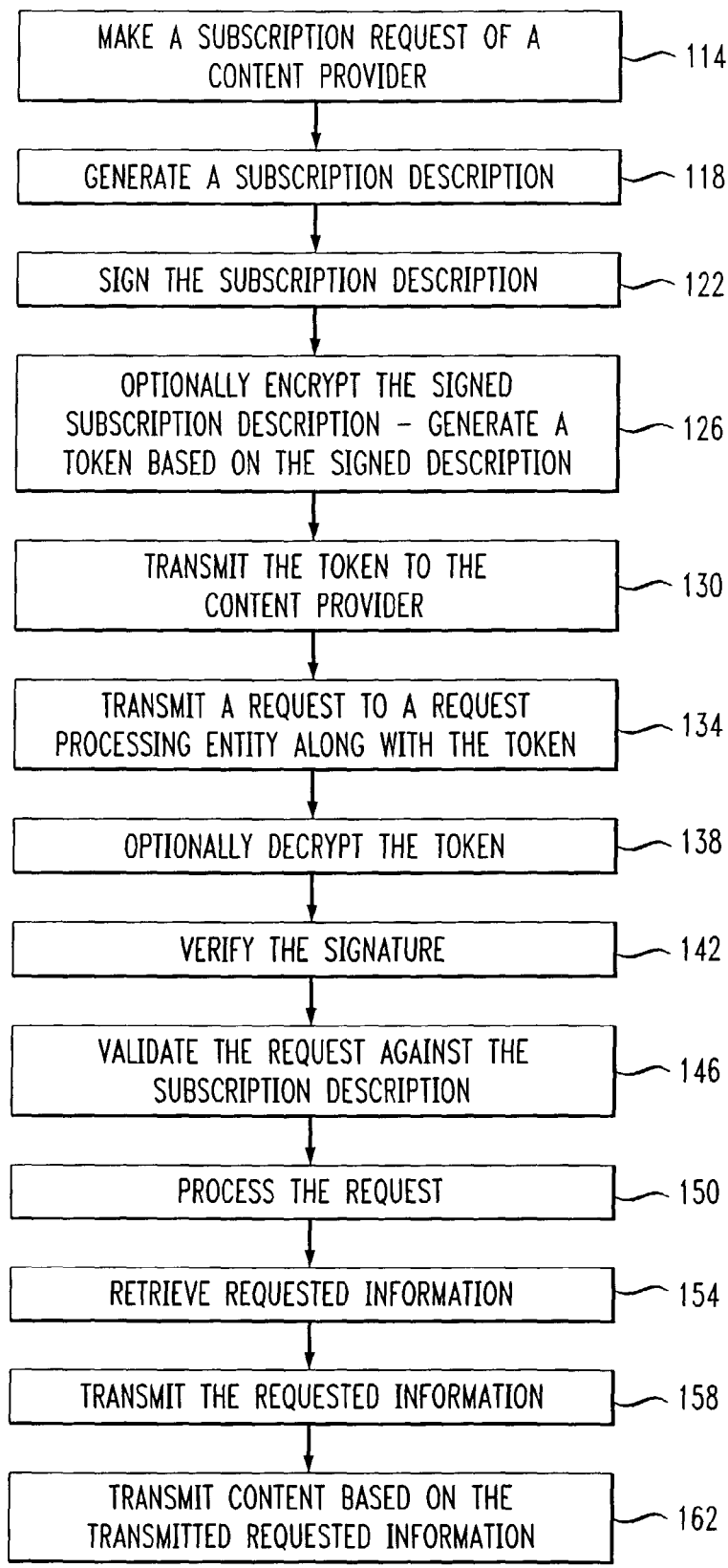
FIG. 1 is a flow chart outlining a method for subscribing to a service in a distributed architecture.
Figure 2:
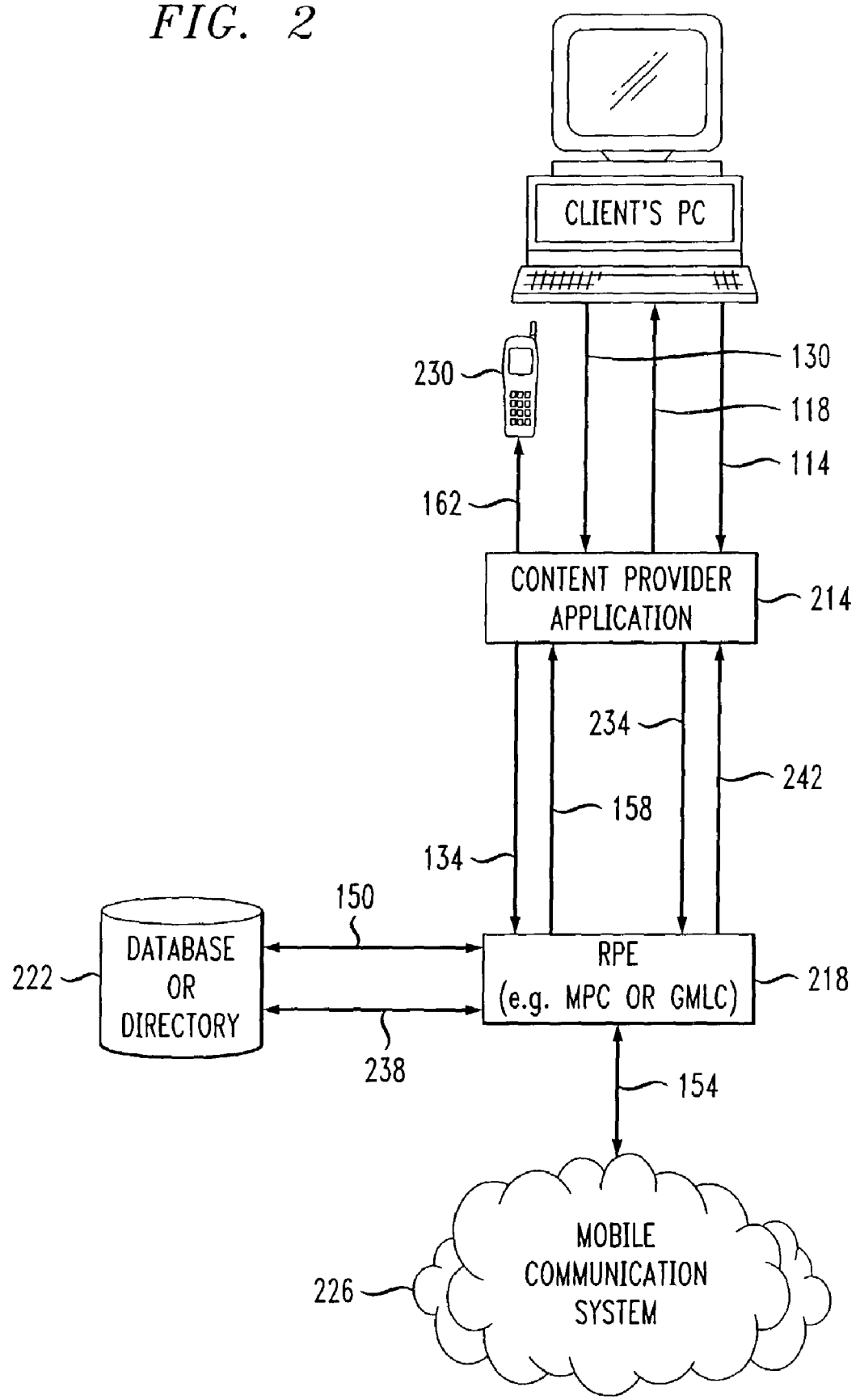
FIG. 2 is combination flow chart and block diagram indicating the flow of information in a distributed architecture wherein the method of FIG. 1 is practiced.

For example, referring to FIG. 1 and FIG. 2, a client or user accesses a web page of a content provider that provides a location-specific service to which the client wants to subscribe. For example, the client accesses the web page from a personal computer (PC) of the client. Through the services of the web page, the client personalizes the service subscription by selecting parameters that satisfy preferences or rules of use of the client. For example, parameters are entered or selected indicating that the content provider may query a mobile phone service provider of the client for the location of the client every morning at 8 o'clock. Of course, these suggested parameters are exemplary only. Any other criteria might be used to place constraints on information made available to the content provider. When the client is satisfied that all the subscription defining parameters have been correctly selected or entered, the client submits the subscription request to the content provider for processing. For example, a server of the content provider processes this subscription and generates a page stating all the details (including, among other things, the identity of the client, the mobile identification number (MIN) of a mobile device of the client, the constraints specified, subscription duration or end date, etc.).

Software running on the PC of the client then cryptographically signs the generated document with a private key of the client, and optionally encrypts the result with a public key of the mobile service provider's request processing entity (RPE).

The result of the encryption is a binary string. The binary string is made available to the content provider server as a "service token" that is bound to the identity of the client. Alternatively, if the signed document is not encrypted, the signed document itself becomes the token. If a well-defined format is used for interactions between a client and a content provider server during a subscription session, signing and encryption processes can be carried out using an Message Digest 5 (MD5) or a Secure Hash Algorithm-1 (SHA-1) hash of the document that contains the information of interest.

The subscription here binds the three parties, namely, the subscriber or client, the content provider application and the RPE together very closely, i.e., the subscription cannot be reused by the content provider application to query user location from a different RPE so long as the RPE verifies the token.

Referring to FIG. 1 and FIG. 2, a method 110 for subscribing to a service in a distributed architecture includes, for example, a client making a subscription request 114, a content provider server generating a page including subscription information 118, the client signing the information 122, the client optionally encrypting the information 126, for example, with a public key of a request processing entity (RPE), thereby generating a service token, and the client transmitting the service token to the content provider 130. Alternatively, the token is generated from the signed document without encryption 126.

The client making a subscription request 114 includes selecting or entering parameters describing the subscription. The selections or entries imply a grant of permission, when necessary, to access information about the client. For example, the selections or entries imply a grant of permission for a mobile communications service provider to honor requests for location information about the client from the content provider. The selections or entries may also place limits on that grant of permission. For example, the permission may grant access to information once a day, or during a particular time period each day, or only Monday through Friday or any combination of these restrictions or others. The granularity of the location information may also be restricted, for example, to give only the city or zip code in which the user is located rather than exact latitude and longitude coordinates.

The content provider server generating 118 a page including subscription information can include, for example, the generation of a summary web page or email message. The web page or email message includes a statement of the selected or entered parameters. Additionally, the web page or email may include an explicit statement of the permissions implied by the selections or entries. Preferably, the information in the web page or email is in a format readily decoded and understood by the request processing entity. For example, a widely published format such as extensible markup language (XML) should be used in conjunction with, for instance, a well-defined document type definition (DTD).

The client signing 122 the information includes, for example, the addition of a digital signature of the client to a copy of, for example, the web page or email. For example, in a public key encryption environment the copy of the web page or email may be encrypted with a private key of the client. If a receiving entity is able to decrypt the encrypted information using a published public key of the client, the receiving entity is assured that the client was the one that encrypted the information and therefore, in a sense, signed the document. As those of skill in the art will understand, the signature encryption referred to here is different than the additional and optional encryption 126.

The client optionally encrypting 126 the information or signed document with a public key of a request processing entity (RPE) is a security measure. Encryption prevents unauthorized entities from viewing the contents to the document. Only the request processing entity has access to the private key that is required to decrypt the information. The encryption creates a token of authorization. Alternatively, a token is generated without encrypting the signed document.

The client transmits 130 the token to the content provider to use as a kind of letter of introduction.

For example, the first time the content provider attempts to make a delivery of the content called for in the subscription (e.g., weather information for the client's location), a server 214 of the content provider makes a request to an RPE 218 of the mobile communications service provider. For instance, the content provider requests the location of the client (i.e., the location of a mobile device of the client). The request includes the transmission 134 of the token. If the token is encrypted, the RPE attempts to decrypt 138 the token. In either case, the RPE attempts to verify the client signature 142. If the RPE is able to decrypt 138 an encrypted token (for example, by using a private key of the RPE or mobile communications service provider), the RPE is assured that the token was meant to be used in a transaction with the RPE (and not for some other entity) and that the associated document has not experienced tampering. If the token is encrypted to verify the signature 142 of the client, the RPE may, for example, attempt to decrypt the document using a public key of the client. If the RPE is able to decrypt the document using the public key of the client, the RPE is assured that the client "signed" the document and therefore authorized or validated the information in the document. The RPE then validates 146 the request by checking the request against the constraints described in the decrypted document.

If the request falls within the constraints, the RPE 218 processes 150 the request. For example, the RPE 218 may update a database or directory 222 with the client subscription information. If the database 222 is updated, then subsequent requests can be verified via a database query or dip and typically will not require the decrypting of the token and signature verification.

Whether or not the RPE 218 updates a database, the RPE 218 processes the decrypted and validated request and generates a response. For example, the RPE 218 instructs components of a system 226 of the mobile communications service provider to retrieve 154 requested information, such as, for example, a current location of the mobile device of the client. When the mobile device is located the RPE 218 transmits 158 the location information of the client to the content provider 214.

When the content provider receives the requested information (e.g., location information) the server of the content provider can then transmit 162 (e.g., push) content (e.g., location-specific weather information) to the mobile device 230 of the client.

If the RPE 218 does not record 150 the subscription information, for example, by updating client records in the database or directory 222, subsequent requests are handled in much the same way.

If the RPE 218 does record information about the subscription and permissions associated therewith, sequential requests can be handled a bit more efficiently. For example, future location requests 234 are made without the token. Instead, the request simply includes the mobile identification number MIN identifying the mobile device 230 of the client. The RPE 218 validates 238 the request by, for example, performing a database query or dip to compare the request against recorded permission or subscription constraints. If the request is valid, the RPE 218 processes the request and transmits 242 the requested information (e.g., client location) to the content provider 214 and again the content provider server 214 transmits 162 the subscribed for content back to the mobile device 230 of the client.

As an alternative or addition to the public key/private key technique describe above, the client may sign a one-way hash of the document, then use a "digital envelope" to securely transmit a symmetrically encrypted document and the hash to the content provider.

When the content provider server makes a query for the target client or subscriber, the content provider simply forwards a copy of the client agreement (if a hash were used above), along with the service token. Note again that the content provider server is incapable of decrypting the token.

As an additional alternative, a technique similar in concept to that of "dual signatures" employed in SET (Secure Electronic Transactions) may be used if the client wishes to personalize the service on other parameters with which the RPE is not concerned while simultaneously constraining RPE location fixes in ways such that the content provider server does not need to be aware. However, this feature does incur significant overhead and is generally not required by typical clients. In electronic commerce architectures, this technique is used to enable a client to make an offer to a merchant, with payment instructions to his bank if the offer is accepted, while ensuring that the merchant does not see payment instructions, and the bank is unaware of the terms of the negotiated offer between the merchant and the client. The process, however, simultaneously ensures that the agreed-upon price is paid.

While the above procedure works, it is not as computationally efficient as some other techniques. For example, some improvements may be obtained by using keyed hashes instead of public key cryptography. This is especially important if one wants mobile handsets to be able to handle crypto-related processing (they might not have the processing capabilities to handle public-key signatures and encryption). However, the subscriber is required to perform cryptographic operations only once per service (at subscription time), so if all subscriptions were handled over web interfaces by PCs, this may not be a significant issue.

If keyed hashes were used, the RPE would need to have the key used by the end-user when the hash function is applied to the negotiated profile (i.e.; the subscription description page). Once the content provider obtains the signed token, it would be used in a manner similar to the above described transactions between the content provider server and the RPE. The content provider server also includes, with the request, the text that was included in the keyed hash so that the RPE may re-compute the hash with the key associated with the target subscriber. (This may require that the RPE make a secure directory access to determine a given subscriber's key as registered with the system). This re-computed hash may then be used for verification.

It should be noted that, in the embodiments described above, the client or target subscriber should be provided means to sign "limited-time" subscription tokens only because in these embodiments there is no easy way to guarantee that servers would pass on tokens that constrain their existing access further. For example, if high-granularity location (say in terms of latitude and longitude) were made available to the content provider, then at some point the client might find this level of tracking too invasive. The client might want to reduce the granularity or position information resolution, which the RPE provides the content provider. For example, instead of describing the client's location within a square mile, the client may wish the RPE to only provide the content provider with the name of a nearest city. However, the above-described embodiments do not provide a means to easily revoke the high granularity permission previously granted.

Therefore, in cases where greater security is required, one may need to support "authorization revocation lists" similar in concept to certificate revocation lists (CRLs) in use today to enforce the revocation of authorization tokens. However, with carefully constraint specification, and by issuing limited time tokens, clients can ensure that the scheme is not abused even in the general case.

However, when complex constraints are used, the constraints should be independently verifiable by the RPE. For example, if an RPE can not verify the age of stock data, then the constraints should not or cannot include a requirement that the RPE provide the content provider with stock data that is, for example, no more than 15 minutes old.

Figure 3:
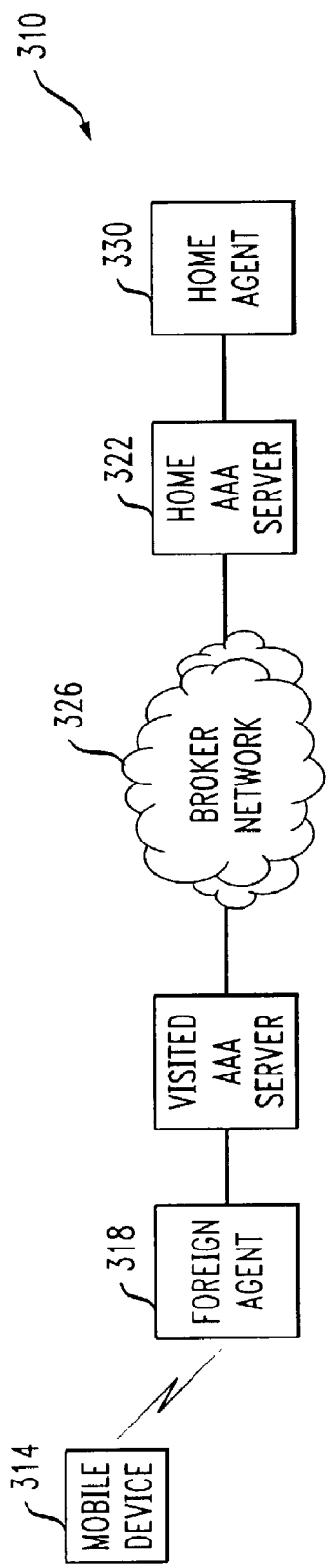
FIG. 3 is block diagram of a contemplated authentication, authorization and accounting infrastructure for use in a mobile communications system.

Referring to FIG. 3, an authentication, authorization and accounting (AAA) infrastructure 310 may be used to support the above operations. Note that a network of AAA servers and brokers is likely to be in place to support network access control for roaming mobile nodes.

It is anticipated that in such a system, all mobile nodes 314 will be configured with Network Access Identifiers (NAIs) and secret keys. The NAI is, for example, of the form—user@example.com—. Here—example.com—is referred to as the user's realm, or home domain. When a mobile node 314 connects to a foreign agent 318 in a visited network, the mobile node 314 will send a registration request that contains the NAI of the mobile node 314 and an authentication extension computed with the use of a secret or private key of the mobile node 314. The realm portion is used to route the request back to a home AAA server 322, which validates the authenticity of the request and returns the result. Note that the request may travel through a network of brokers 326 before it reaches the home AAA server 322. When the home AAA server 322 returns a successful authorization to the broker network 326, it is in effect promising to pay for the services rendered to the mobile node 314. Also, when the foreign agent 318 subsequently sends accounting records through the network 310, the foreign agent 318 will look to the broker 326 for final settlement of charges. The broker network 326 is, therefore, in the business of maintaining large numbers of pairwise business relationships with both home and visited carriers; the broker network 326 serves as the nexus for billing and settlement.

This infrastructure can also be used to facilitate third party service subscriptions similar to those described above.

Figure 4:
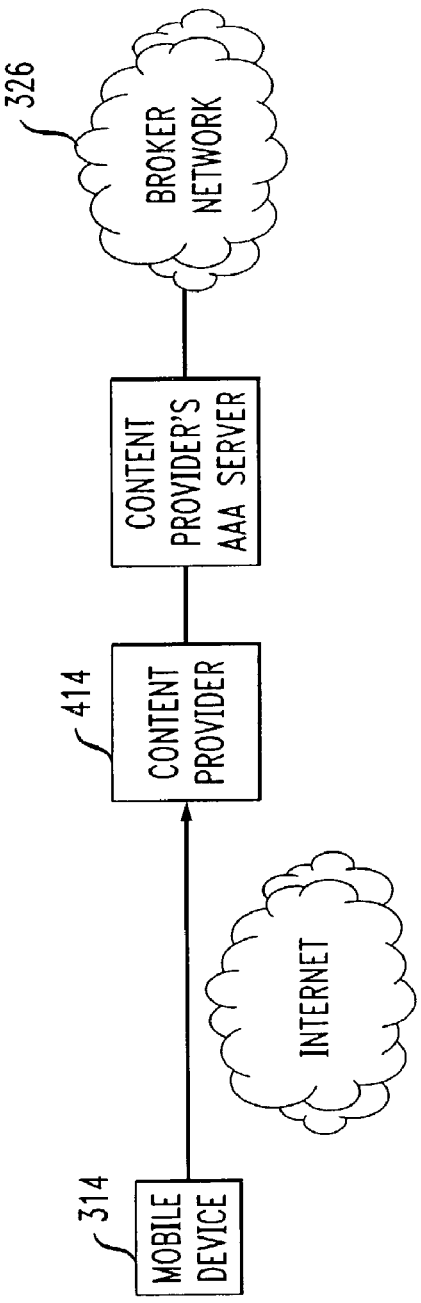
FIG. 4 is block diagram of an adaptation of the authentication, authorization and accounting infrastructure of FIG. 4 for facilitating the method of FIG. 1.

For example, referring to FIG. 4 the mobile node or device 314 is registered with a content provider 414 using the same NAI and credentials that it uses for network access. However, in this case, the registration is at the layer of session initiation protocol (SIP) or hyper text transfer protocol (HTTP) rather than the network layer. The content provider 414 can use the same broker network 326 to authenticate the user, and later to send accounting records for services delivered. This enables the content provider 414 to get paid and the user (not shown, but associated with the mobile device 314) to be billed for these services; the home network, which contains the home AAA server 322, may be paid a percentage or portion of the transaction fees.

At the algorithm level, the AAA infrastructure 310 could be used to distribute secret keys for use between the mobile node 314 and the content provider 414 as well as for use between the content provider 414 and the RPE 218 of the home mobile service provider. This would obviate the need for potentially expensive public key cryptographic operations throughout the network. However, even if public keys are used, the AAA infrastructure 310 could be used to distribute those keys or public key certificates for them.

The invention has been described with reference to particular embodiments. Modifications and alterations will occur to others upon reading and understanding the specification. It is intended that all such modifications and alterations are included insofar as they come within the scope of the appended claims or equivalents thereof.

What is claimed is:

1. A method of providing a service in a distributed architecture environment, the environment including a client, a content provider and a request processing entity, the method comprising:
   making a subscription request of the content provider by the client;
   generating a subscription description based on the subscription request;
   adding a digital signature to the subscription description by the client;
   generating a token based on the signed subscription description;
   including the token in a request made of the request processing entity;
   verifying the digital signature of the client by the request processing entity;
   processing the request by the request processing entity; and
   providing, by the content provider, the service to the client based on results of the processed request.

2. The method of claim 1 wherein the generating of the token comprises encrypting the signed subscription description.

3. The method of claim 1 wherein the generating of the subscription description comprises generating a one-way hash of a page describing the subscription.

4. The method of claim 1 wherein the generating of the subscription description comprises generating a page describing the subscription.

5. The method of claim 2 wherein the encrypting is based on a public key of the request processing entity.

6. The method of claim 2 wherein the encrypting comprises combining a one-way hash of a page describing the subscription with a digital envelope.

7. The method of claim 1 wherein the processing of the request comprises providing the content provider with information about the client.

8. The method of claim 1 wherein the processing of the request comprises providing the content provider with information.

9. The method of claim 7 wherein the providing of the content provider with information comprises providing the content provider with information about a location of a mobile device of the client.

10. The method of claim 1 wherein the processing of the request comprises:

updating a database or directory of the request processing entity with information about the subscription.

11. The method of claim 1 further comprising, before the processing of the request, checking the request against an authorization revocation list by the request processing entity, thereby ensuring a continued validity of the request.

12. The method of claim 10 further comprising:
receiving, by the request processing entity, an additional request from the content provider in regard to the subscription;
validating, by the request processing entity, the additional request based on information in the database or directory;
processing, by the request processing entity, the validated additional request.

13. The method of claim 12 wherein the receiving of the additional request comprises receiving a request without a token.

14. The method of claim 1 wherein generating the subscription description comprises identifying constraints on information provided by the request processing entity to the content provider.

15. The method of claim 2 wherein the encrypting is based on a key provided by an authentication, authorization and accounting infrastructure.

16. A method of providing a service in a distributed architecture environment, the environment including a client, a first entity providing a first good and/or service to the client and a second entity providing a second good and/or service to the client wherein the first entity must request an aspect of the second good or service from the second entity in order to deliver the first good or service to the client and wherein the second entity must have assurance that honoring the request of the first entity is authorized, the method comprising:
ordering a first good or service from the first entity by the client;
generating a description of the aspect of the second good or service;
signing the description by an authorizing entity;
generating a token based on the signed description;
including, by the first entity, the token with the request made of the second entity;
verifying, by the second entity, the signature of the authorizing entity;
honoring, by the second entity, the request; and
delivering the first good or service to the client by the first entity based on the honored request.

17. The method of claim 16 wherein the signing of the description comprises the client signing the description.

18. The method of claim 16 wherein the honoring of the request comprises a mobile communications service provider delivering information about the client to the first entity.

19. The method of claim 16 wherein the generating of a token comprises encrypting the signed description and wherein the method further comprises decrypting the token by the second entity.

20. The method of claim 19 wherein the encrypting is based on a public key of the second entity.

21. The method of claim 16 wherein the honoring of the request comprises providing the first entity with information about the client.

22. The method of claim 16 wherein the honoring of the request comprises providing the first entity with information about a location of a mobile device of the client.

23. The method of claim 16 wherein the honoring of the request comprises:
updating a database or directory of the second entity with information about the description of the aspect of the second good or service.

24. The method of claim 23 further comprising:
receiving, by the second entity, an additional request from the first entity according to the aspect of the second good or service;
validating, by the second entity, the additional request based on information in the database or directory;
honoring, by the second entity, the validated additional request.

25. The method of claim 16 wherein the generating of a description of the aspect of the second good or service comprises identifying constraints on information provided by the second entity to the first.

26. The method of claim 19 wherein the encrypting is based on a key provided by an authentication, authorization and accounting infrastructure.

27. A system for providing a service in a distributed architecture environment, the environment including a client, a content provider and a request processing entity, the system comprising:
means for making a subscription request of the content provider by the client;
means for generating a subscription description based on the subscription request;
means for adding a digital signature to the subscription description by the client;
means for generating a token based on the signed subscription description;
means for including the token in a request made of the request processing entity;
means for verifying the digital signature of the client by the request processing entity;
means for processing the request by the request processing entity; and
means for providing, by the content provider, the service to the client based on results of the processed request.

28. The system of claim 27 wherein the request processing entity is further operative to check the request against an authorization revocation list, thereby ensuring a continued validity of the request before processing the request or preventing the processing of the request if the authorization revocation list indicates that the authorization has been revoked.

29. The system of claim 27 wherein the request processing entity is comprised within a mobile positioning center.

30. The system of claim 27 wherein the request processing entity is comprised within a gateway mobile location center.

31. The system of claim 27 wherein the request processing entity is further operative to receive an encrypted token and decrypt the encrypted token.

* * * * *